United States Patent Office 3,523,099
Patented Aug. 4, 1970

3,523,099
PRIMARY PHOSPHITES AS STABILIZERS FOR METAL-CONTAMINATED MATERIALS
Alvin F. Shepard and Bobby F. Dannels, Grand Island, N.Y., assignors to Hooker Chemical Corporation, Niagara Falls, N.Y., a corporation of New York
No Drawing. Continuation-in-part of application Ser. No. 423,593, Jan. 5, 1965. This application Oct. 4, 1967, Ser. No. 672,719
Int. Cl. C10m 1/44; C08f 45/58, 45/62
U.S. Cl. 260—45.75         28 Claims

ABSTRACT OF THE DISCLOSURE

A method for the deactivation of metal-containing compositions comprising adding a minor proportion of a primary phosphite having the formula:

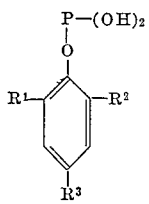

or a salt of a primary phosphite having the formula:

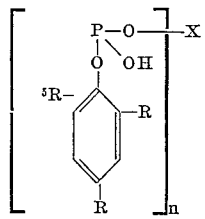

wherein $R^1$, $R^2$, $R^4$ and $R^5$ are organic radicals having from 4 to 12 carbon atoms, $R^3$ and $R^6$ are selected from the group consisting of hydrogen, halogen and organic radicals having from 1 to 12 carbon atoms, X is selected from the group consisting of ammonium, substituted ammonium and metal radical, and $n$ is an integer from 1 to 4, representing the valence of X, to an organic substance which is reasonably stable under normal conditions, but which deteriorates when exposed to an oxygen-containing gas in the presence of a metal or metal compound.

---

This is a continuation-in-part of U.S. Ser. No. 423,593 filed on Jan. 5, 1965, now abandoned.

This invention relates to novel metal deactivators. More particularly, it relates to the deactivation of metals, in compositions containing them, by utilizing primary phosphite deactivators and their metal derivatives.

Metals and metal compounds are prone to promote oxidation, resinification or degradation in a wide variety of compositions. Sometimes such changes are desirable, as witness the use of soluble derivatives of cobalt, lead, copper and the like, to promote oxidation and polymerization of oil varnishes. Frequently, however, these changes are highly undesirable as for example when polypropylene or polyvinyl chloride containing metal impurities are exposed to air at elevated temperatures with resultant weakening and discoloration of the composition. Available metal deactivators and sequestrants, however, are not effective against all metals. Even with the better deactivators, large amounts are often needed. For metal deactivation in oils, it has apparently been necessary to use free acids rather than other less corrosive derivatives. Because the degree of degradation of a composition caused by the presence of a metal contaminant is significantly and substantially greater than degradation of that composition in the absence of the metal contaminant, stabilizing agents effective against degradation in the absence of the metal contaminant are not always effective to stabilize in the presence of the metal contaminant. Moreover, it would be expected that the salt of a metal contaminant would likewise cause degradation, in contrast to the actual stabilizing action of the metal phosphites of this invention; thereby, this again serves to illustrate the lack of predictability (lack of obviousness) of the phosphites and their salts against the degrading metal contaminants.

In the Journal of Polymer Science, part A, vol. 2, pages 587 and 588 in the "Introduction," it is pointed out that oxidative degradation of various relatively unhindered polyolefins is an existing problem at elevated temperatures, the problem being even greater for relatively unhindered branched hydrocarbon polyolefins such as polybutene-1 and polypropylene, for example, as compared to unhindered comparatively unbranched polyethylene, for example.

An object of this invention is to provide metal deactivators effective in small proportions against a variety of metal contaminants.

Another object is to provide primary phosphite deactivators which are effective in the form of their corresponding metal salts.

Other objects of the invention will be apparent from the following detailed description.

In accordance with the practice of this invention, it has now been found that metals, in compositions containing them, may be deactivated and their deleterious effect overcome or reduced by the addition of minor portions of a primary aryl phosphite or the corresponding metal salt.

The superior results attained, when employing the method of this invention, were unexpected in view of the generally known fact that primary phosphites are highly unstable, hydrolyzing in the presence of small amounts of moisture to yield free phosphorous acid, which itself has undesirable deteriorating properties. Also, in the case of the metallic salts of the primary phosphites, there is the additional objection to the presence therein of the metals which, as previously indicated, are prone to promote undesirable deteriorating reactions.

As the primary aryl phosphites there can be used compounds having the formula:

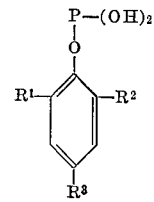

wherein $R^1$ and $R^2$ are organic radicals having from 4 to 12 carbon atoms, and $R^3$ is selected from the group consisting of hydrogen, halogen and organic radicals having from 1 to 12 carbon atoms.

More particularly, $R^1$ and $R^2$ may be organic radicals such as alkyl having from 4 to 12 carbon atoms or aralkyl having from 7 to 12 carbon atoms, and $R^3$ may be hydrogen, halogen such as chlorine or bromine, or an organic radical such as alkyl having from 1 to 12 carbon atoms, preferably 4 to 12 carbon atoms, or aralkyl having from 7 to 12 carbon atoms. Typical examples of these include 2,4,6 - tri - t - butylphenyl phosphite, 2,6-di-t-butylphenyl phosphite, 2,6-di-t-butyl-4-dodecylphenyl phosphite, 2,6-di-t-butyl-4-nonylphenyl phosphite, 2,6-di-t-butyl-4-chlorophenyl phosphite, 2,6-di-t-butyl-4-bromophenyl phosphite, 2,4,6-tri-phenylethylphenyl phosphite, and the like.

The phosphite deactivators of this invention are prepared by a method described in U.S. patent application Ser. No. 220,902, filed Aug. 31, 1962, now U.S. Pat. 3,271,481, granted Sept. 6, 1966. The method comprises reacting the desired substituted phenol with a phosphorus trihalide and preventing the accumulation of halogen acid in the reaction mixture by the utilization of a tertiary amine.

Preferably, the primary phosphite deactivators are employed in the practice of this invention as the salts. These salts have the formula:

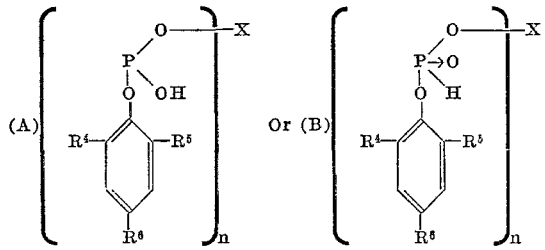

wherein $R^4$ and $R^5$ are organic radicals having from 4 to 12 carbon atoms, $R^6$ is selected from the group consisting of hydrogen, halogen, organic radicals having from 1 to 12 carbon atoms, X is selected from the group consisting of ammonium, substituted ammonium and metal radicals, and $n$ is an integer from 1 to 4 representing the valence of X, which may be as previously indicated. Two formulas have been illustrated to indicate that two forms of primary phosphites are believed to exist. However, Formula A will be used throughout this application as the presently preferred form.

More particularly, $R^4$ and $R^5$ may be organic radicals such as, alkyl having from 4 to 12 carbon atoms or aralkyl having from 7 to 12 carbon atoms, $R^6$ may be hydrogen, halogen such as chlorine or bromine, or an organic radical such as, alkyl having from 1 to 12 carbon atoms, preferably 4 to 12 carbon atoms or aralkyl having from 7 to 12 carbon atoms.

The salts of the primary phosphites of this invention may be those of metals broadly classified as the metals of Groups 1 to 8, inclusive, of the Periodic Table of Elements. These metals comprise the following: sodium, lithium, radium, potassium, rubidium and caesium, beryllium, magnesium, calcium, strontium, barium, zinc, cadmium, mercury, scandium, aluminum, gallium, indium, thallium, titanium, zirconium, cerium, thorium, germanium, tin, lead, vanadium, columbium, tantalum, arsenic, antimony, bismuth, chromium, molybdenum, tungsten, uranium, rhenium, manganese, iron, cobalt and nickel. Particularly preferred of these metals, however, are sodium, potassium, copper, cobalt, lead, calcium, zinc, iron, nickel, tin, chromium.

The method of preparing the salts of this invention is described in a copending application, Ser. No. 423,583, filed on Jan. 5, 1965, now U.S. Pat. 3,412,118 granted Nov. 19, 1968. Generally, the non-metallic salts of the primary phosphites of this invention, such as the ammonium salt, are prepared by the reaction of a compound derived from ammonia and a primary phosphite of this invention. As the compounds derived from ammonia there can be used ammonium compounds and substituted ammonium compounds such as amines and quaternary ammonium compounds. Typical examples of these include methylamine, dimethylamine, trimethylamine, ethylamine, propylamine, ammonia, ammonium hydroxide, tetramethyl ammonium hydroxide, tetramethyl ammonium chloride, and the like. The metallic salts of the primary phosphites are prepared by the reaction of a primary aryl phosphite with an appropriate salt or hydroxide in the presence of a suitable solvent. Typical examples of these salts or hydroxides include sodium hydroxide, lead acetate, zinc chloride, chromium nitrate, and the like.

Typical examples of the salts of the primary phosphites include the sodium salt of 2,4,6-di-t-butylphenyl phosphite, lead salt of 2,4,6-tri-t-butylphenyl phosphite, $Pb(C_{18}H_{30}PO_3)_2$, calcium salt of 2,4,6-tri-t-butylphenyl phosphite, iron salt of 2,6-di-t-butyl-4-nonylphenyl phosphite, $Fe(C_{18}H_{30}PO_3)_2$, nickel salt of 2,6-di-t-butylphenyl phosphite and the like.

The amounts of phosphite deactivator to be added to the metal-containing compositions effectively to suppress the catalytic action of the metal contaminants will naturally vary with the stability requirements of the treated product, as well as the amount of metal contained in the composition.

In general, amounts in the range of .01 to 2.0 percent based on the weight of the composition are useful and provide the protection required. It is preferred to employ the phosphite deactivator in the range of 0.1 to 1.0 percent based on the weight of the composition.

The metal deactivators of this invention are effective in various organic compositions which are reasonably stable upon exposure to an oxygen-containing gas under normal conditions of usage in the absence of metal contaminants, but which deteriorate in their presence. These metal contaminants represent a minor proportion, not more than about 2 percent, of the organic composition and generally introduced during manufacture, processing or use of the composition. Typical metal contaminants include: cobalt, lead, barium, cadmium, copper, iron, manganese, their compounds and their ionic forms. Typical of the organic compositions are synthetic rubbers, polymers of relatively unhindered hydrocarbon olefins and halogenated vinyls, examples of which include polypropylene, polyvinyl chloride and diene rubbers such as GRS, a conventional designation for a copolymer of butadiene and styrene for example as is identified in U.S. Pat. No. 2,732,365, column 4, lines 73–75.

Other compositions which can be effectively deactivated include, for example, (a) those substantially stable alkyl aromatic hydrocarbons which are characterized by the property of being readily oxidized to a peroxide form unstable to heat, such as (1) pseudocumene, (2) p-diethyl benzene, (3) 1,3,5-tricyclohexyl benzene, (4) isopropyl naphthalene, (5) isopropyl phenanthrene, (6) 1,3,5-triisopropyl benzene, and (7) the like; (b) unsaturated oils and fats such as unsaturated animal fats and oils and unsaturated vegetable fats and oils such as shark oil, neatsfoot oil, almond oil, linseed oil, beef marrow oil, olive oil, soya bean oil, peanut oil, poppy seed oil, safflower oil, corn oil, whale oil, goose fat, horse fat, and the like; and (c) unstable synthetic oils such as (1) straight-run or cracked gasoline, (2) lubricating oil such as motor oil, (3) sebacates such as di(2-ethylhexyl) sebacate, for example, (4) polyglycols, (5) polyisobutylene and (6) the like.

The above illustrative polymers of hydrocarbon olefins, halogenated vinyls, diene rubbers, alkyl aromatic hydrocarbons, unsaturated animal fats and oils, unsaturated vegetable fats and oils, and unstable synthetic oils all have the common properties of being subject to degradation via oxidation, and of being stabilized, in the presence of a degrading amount of a metal contaminant, against degradation by the presence of a stabilizing amount (i.e., a minor amount), of the primary phosphite (or metalsalts thereof) of this invention. Moreover, irrespective of the mechanism of degradation of these various materials, it is sufficient for purposes of this invention that the primary phosphite of this invention stabilizes each of the materials against degradation, the common property insofar as the scope of the applicants' invention.

The following examples are given to illustrate the present invention. All temperatures are in degrees centigrade and parts are by weight, unless otherwise mentioned.

EXAMPLE 1

The method for the preparation of a primary phosphite of a hindered phenol is illustrated.

A mixture of 3787 parts of $PCl_3$ and 833 parts of triethylamine was charged to a pot reactor from which moisture was excluded. A total of 1875 parts of 2,4,6-tri-t-butylphenol were added in small increments over a two-hour period at 7 to 15 degrees centigrade. The solid amine hydrochloride was then filtered off and washed with petroleum ether. The wash and filtrate were combined, then the solvent, unreacted $PCl_3$ and amine were distilled off. The residue was hydrolyzed by treatment with a large volume of water. The resulting solid was washed with water and then with n-hexane. Upon drying, 1976 parts of primary phosphite were obtained which, without further treatment, had a titer indicating 99.9 percent purity.

EXAMPLE 2

A typical method for the preparation of a salt of a primary phosphite deactivator employed in the practice of this invention is illustrated.

In a suitable reactor, 326 parts of 2,4,6-tri-t-butylphenyl phosphite was slowly mixed with 2500 parts of water that contained 40 parts of NaOH. A solution of 162 parts of lead acetate in 1000 parts of water was then slowly added. A white solid formed immediately. Sufficient chloroform was then added to dissolve the solid. Thereafter, the chloroform layer was separated and dried. Evaporation of the solvent left the lead salt in the form of a white powder having a melting point in the range of 135–140 degrees centigrade. The product was the lead salt of 2,4,6-tri-t-butylphenyl phosphite, $Pb(C_{18}H_{30}PO_3)_2$. The salt contained 24.5 percent lead. The theoretical lead content of such a compound is 24.1 percent.

To demonstrate the metal deactivating power of the compounds of the type described above and illustrated by the foregoing examples in various organic compositions which are reasonably stable upon exposure to air under normal conditions of usage in the absence of metal contaminants, but which deteriorate in their presence, several comparative examples were conducted.

EXAMPLE 3

The deactivating power of small amounts of the materials of this invention toward the copper-promoted degradation of polypropylene is illustrated.

Mixtures were prepared as shown in the table below and were spread out evenly inside 2 inch glass crystallizing dishes held at 175 degrees centigrade, for 25 minutes in a circulating air oven, then cooled to yield the products in the form of solid plastic discs. The discs varied greatly in toughness as shown below.

|  | A | B | C | D | E | F |
|---|---|---|---|---|---|---|
|  | Parts | | | | | |
| Unstabilized polypropylene powder | 2.000 | 2.000 | 2.000 | 2.000 | 2.000 | 2.000 |
| Copper oleate | 0.010 | 0.010 | 0.010 | | | |
| Copper metal powder | | | | 0.002 | 0.002 | 0.002 |
| Lead salt of 2,4,6-tri-t-butylphenyl phosphite $Pb(C_{18}H_{30}PO_3)_2$ | | 0.020 | | | 0.020 | |
| Primary 2,4,6-tri-t-butylphenyl phosphite | | | 0.020 | | | 0.020 |
| Character of disc | (1) | (2) | (2) | (1) | (2) | (2) |

1 Brittle.
2 Flexible tough.

About 1.0 percent of a salt or a free acid of our invention thus serves to protect polypropylene in the absence of any other added stabilizer. When equimolar amounts of a salt such as the lead salt of 2,6-di-t-butyl-4-nonylphenyl phosphite, the iron salt of 2,6-di-t-butyl-4-nonylphenyl phosphite, the nickel salt of 2,6-di-t-butylphenyl phosphite, the lead salt of 2,6-di-t-butyl-4-chlorophenyl phosphite and the like are used in place of the lead salt of 2,4,6-tri-t-butylphenyl phosphite, corresponding results are obtained. When equimolar amounts of a primary phosphite such as 2,6-di-t-butylphenyl phosphite, 2,6-di-t-butyl-4-nonylphenyl phosphite, 2,6-di-t-butyl-4-bromophenyl phosphite, 2,4,6-tri-phenylethylphenyl phosphite and the like are used in place of the primary 2,4,6-tri-t-butylphenyl phosphite, corresponding results are obtained.

EXAMPLE 4

Although copper and its compounds usually promote the oxidative degradation of polypropylene, a typical salt of our invention, namely, the copper salt of 2,4,6-tri-t-butylphenyl phosphate $[Cu(C_{18}H_{30}PO_3)_2]$, actually functions to protect the polymer. The tin salt of the same acid also behaves in the same way as illustrated by this example.

The mixtures indicated in the table below were blended from powdered ingredients in the proportions shown and then were baked in air at 175 degrees centigrade for 25 minutes as in Example 3. Results are shown in the table.

|  | A | B | C |
|---|---|---|---|
|  | Parts | | |
| Unstabilized polypropylene powder | 2.000 | 2.000 | 2.000 |
| Copper salt of 2,4,6-tri-t-butylphenyl phosphite $Cu(C_{18}H_{30}PO_3)_2$ | | 0.002 | |
| Tin salt of 2,4,6-tri-t-butylphenyl phosphite $Sn(C_{18}H_{30}PO_3)_2$ | | | 0.002 |
| Weight change | +0.004 | 0.000 | −0.002 |
| Properties of product | (1) | (2) | (3) |

1 Very brittle.
2 Flexible fairly tough.
3 Flexible tough.

EXAMPLE 5

The following compositions were mixed together on hot differential rolls and formed into flat strips. The strip samples were then baked in air for 150 minutes at 175° C. with the results shown below.

|  | Polyvinyl chloride, parts | Dioctyl phthalate, parts | Barium cadmium laurate, parts | Additive | Strip color after heating |
|---|---|---|---|---|---|
| A | 5.00 | 2.00 | 0.4 | None | Black. |
| B | 5.00 | 2.00 | 0.4 | Lead salt of 2,4,6-tri-t-butylphenyl phosphite $Pb(C_{18}H_{30}PO_3)_2$. | Pale amber. |
| C | 5.00 | 2.00 | 0.4 | Calcium salt of 2,4,6-tri-t-butylphenyl phosphite $Ca(C_{18}H_{30}PO_3)_2$. | Do. |

When equimolar amounts of a salt such as the copper salt of 2,4,6-tri-t-butylphenyl phosphite, the tin salt of 2,6-di-t-butyl-4-nonylphenyl phosphite, the nickel salt of 2,6-di-t-butyl-4-chlorophenyl phosphite and the like are used in place of the lead salt of 2,4,6-tri-t-butylphenyl phosphite, corresponding results are obtained. When equimolar amounts of a primary phosphite such as 2,6-di-t-butylphenyl phosphite, 2,6-di-t-butyl-4-chlorophenyl phosphite, 2,4,6-tri-t-butylphenyl phosphite and the like are used in place of the lead salt of 2,4,6-tri-t-butylphenyl phosphite, corresponding results are obtained.

EXAMPLE 6

The following mixtures were heated for 48 hours at 100 degrees centigrade in reaction vessels which were loosely stoppered with glass wool. The products were compared with unheated triisopropyl benzene for freezing point, refractive index and hydroperoxide content.

|  | A | B | C | D |
|---|---|---|---|---|
|  | Parts | | | |
| 1,3,5-tri isopropyl benzene | 5.00 | 5.00 | 5.00 | [1] 5.00 |
| Cobalt salt of 2,4,6-tri-t-butylphenyl phosphite $Co(C_{18}H_{30}PO_3)_2$ | | 0.005 | | |
| Cobalt drier (cobalt salt of 2-ethylhexoic acid, in liquid form, containing 6% cobalt) | | | | 0.0083 |
| Product: | | | | |
| Freezing point | [2] | −8° | [2] | −6.5° |
| Refractive index $N_D^{25}$ | 1.4905 | 1.4870 | 1.5044 | 1.4865 |
| Percent hydroperoxide | 28 | .04 | | |

[1] Unheated.
[2] Did not freeze at −30°.

Mixtures A and C, containing no additive respectively, are considerably degraded as shown by their high refractive indexes and contents of hydroperoxide. In contrast, mixture B, containing cobalt in the form of primary phosphite salt, has undergone practically no change as shown by freezing points and refractive indices.

EXAMPLE 7

Using the same procedure as in Example 6, the following results were obtained with lead derivatives.

|  | A | B |
|---|---|---|
|  | Parts | |
| 1,3,5-tri isopropyl benzene | 5.00 | [1] 5.00 |
| Lead drier (24% lead) | 0.002 | |
| Lead salt of 2,4,6-tri-t-butylphenyl phosphite— $Pb(C_{18}H_{30}PO_3)_2$ | 0.005 | |
| Product: | | |
| Freezing point | −7° | −6.5° |
| Refractive index $N_D^{25}$ | 1.4864 | 1.4865 |
| Percent hydroperoxide | 0.25 | |

[1] Unheated.

EXAMPLE 8

The deactivation of a metal-containing hydrocarbon composition by a primary phosphite of this invention is illustrated.

The mixtures shown below were treated by the procedure of Example 6 except that the heating time was increased to 65 hours at 100 degrees centigrade, and weight gains or losses of the sample were recorded as an index of oxygen pickup. The parts of drier employed are given as parts of metal present in the drier.

| | A | B | C | D | E | F | G | H | I | J |
|---|---|---|---|---|---|---|---|---|---|---|
| | Parts | | | | | | | | | |
| 1,3,5-triisopropylbenzene | 5.000 | 5.000 | 5.000 | 5.000 | 5.000 | 5.000 | 5.000 | 5.000 | 5.000 | 5.000 |
| Iron drier | | | | | | | | | | |
| Manganese drier | | 0.008 | 0.008 | | | | | | | |
| Cobalt drier | | | | 0.008 | 0.008 | | | | | |
| Copper drier | | | | | | 0.008 | 0.008 | | | |
| Lead drier | | | | | | | | | 0.002 | 0.002 |
| Primary 2,4,6-tri-t-butylphenyl phosphite | | | 0.005 | | 0.005 | | 0.005 | | | 0.005 |
| Weight change, gram | +0.02 | +0.03 | +0.20 | −0.12 | +0.03 | −0.33 | +0.22 | −0.21 | +0.05 | −0.39 |
| Hydroperoxide content, percent | 34.1 | 34.9 | | | | | | | | |

NOTE.—In all cases the addition of the primary phosphite strongly inhibited the absorption of oxygen, as indicated by the weight gains or losses.

When equimolar amounts of a primary phosphite such as 2,6-di-t-butylphenyl phosphite, 2,6-di-t-butyl-4-chlorophenyl phosphite, 2,4,6-tri-t-butylphenyl phosphite and the like are used in place of the primary 2,4,6-tri-t-butylphenyl phosphite, corresponding results are obtained. When equimolar amounts if a salt of a primary phosphite such as the manganese salt of 2,6-di-t-butylphenyl phosphite, the aluminum salt of 2,6-di-t-butyl-4-nonylphenyl phosphite, the sodium salt of 2,6-di-t-butyl-4-chlorophenyl phosphite and the like are used in place of the primary 2,4,6-tri-t-butylphenyl phosphite, corresponding results are obtained.

It is to be understood that the foregoing detailed description is merely given by way of illustration and is not intended to limit the scope of the invention in any way, for many variations may be made therein without departing from the spirit of the invention.

What is claimed is:

1. A composition of matter comprising (1) an organic substance selected from the group consisting of a substantially unhindered hydrocarbon polyolefin, polyvinyl chloride, an alkylaryl hydrocarbon, a diene rubber, a vegetable fat, a vegetable oil, an animal fat, an animal oil, gasoline, motor oil and polyglycols, said organic substance being reasonably stable under normal conditions and being unstable when exposed to an oxygen-containing gas in the presence of a metal or metal compound, (2) a minor proportion of a contaminant selected from the group consisting of a metal contaminant and a derivative compound thereof, said metal contaminant being selected from the group consisting of cobalt, lead, barium, cadmium, copper, iron and manganese, and non-primary phosphite salts thereof, and (3) a minor proportion of a primary phosphite having the formula

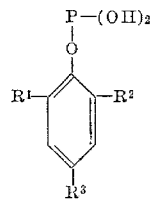

wherein $R^1$ and $R^2$ are selected from the group consisting of alkyl of about 4 to about 12 carbon atoms and aralkyl of about 7 to about 12 carbon atoms and $R^3$ is selected from the group consisting of hydrogen, halogen, alkyl of about 1 to about 12 carbon atoms and aralkyl of about 7 to about 12 carbon atoms.

2. The composition of matter in accordance with claim 1 wherein the primary phosphite is present in an amount in the range of 0.01 to 2.0 percent based on the weight of the composition.

3. The composition of matter in accordance with claim 2 wherein the organic substance is selected from the group consisting of diene rubbers, hydrocarbon polyolefins, and polyvinyl chloride.

4. The composition of matter in accordance with claim 1 wherein $R^3$ of 4 to 12 carbon atoms, and wherein $R^1$ and $R^2$ are alkyl.

5. A composition of matter in accordance with claim 1, wherein the organic substance is selected from the group consisting of polypropylene and 1,3,5-triisopropylbenzene.

6. A composition of matter in accordance with claim 1, wherein $R^1$ and $R^2$ are alkyl.

7. A composition of matter in accordance with claim 1, wherein $R^1$ and $R^2$ are tertiary butyl and the metal or metal compound contaminant is a metal or compound of a metal selected from the group consisting of cobalt, lead, barium, cadmium, copper, iron and manganese.

8. A composition of matter in accordance with claim 7, wherein $R^3$ is hydrogen, and wherein $R^1$ and $R^2$ are tertiary butyl.

9. A composition of matter in accordance with claim 7, wherein $R^1$, $R^2$ and $R^3$ are tertiary butyl.

10. A composition of matter comprising (1) a substantially stable hydrocarbon polyolefin which deteriorates when exposed to an oxygen-containing gas in the presence of a metal contaminant compound selected from the group consisting of cobalt, lead, barium, cadmium, copper, iron and manganese, and non-primary phosphite salts thereof, (2) a contaminating amount of said metal contaminant, and (3) a minor proportion of a primary phosphite having the formula

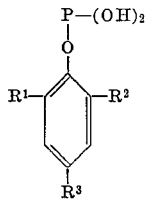

wherein $R^1$ and $R^2$ are selected from the group consisting of alkyl of about 4 to about 12 carbon atoms and aralkyl of about 7 to about 12 carbon atoms, and $R^3$ is selected from the group consisting of hydrogen, halogen and alkyl of about 1 to about 12 carbon atoms and aralkyl of about 7 to about 12 carbon atoms.

11. A composition of matter comprising (1) a substantially stable polyvinyl chloride which deteriorates when exposed to an oxygen-containing gas in the presence of a metal contaminant compound selected from the group consisting of cobalt, lead, barium, cadmium, copper, iron and manganese, and non-primary phosphite salts thereof, (2) a contaminating amount of said metal contaminant, and (3) a minor proportion of a primary phosphite having the formula

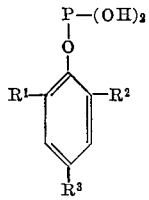

wherein $R^1$ and $R^2$ are selected from the group consisting of alkyl of about 4 to about 12 carbon atoms and aralkyl of about 7 to about 12 carbon atoms, and $R^3$ is selected from the group consisting of hydrogen, halogen and alkyl of about 1 to about 12 carbon atoms and aralkyl of about 7 to about 12 carbon atoms.

12. A composition of matter comprising (1) a substantially stable alkyl aromatic hydrocarbon which deteriorates when exposed to an oxygen-containing gas in the presence of a metal contaminant compound selected from the group consisting of cobalt, lead, barium, cadmium, copper, iron and manganese, and non-primary phosphite salts thereof, (2) a contaminating amount of said metal contaminant, and (3) a minor proportion of a primary phosphite having the formula

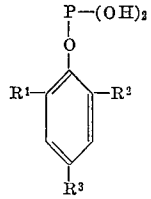

wherein $R^1$ and $R^2$ are selected from the group consisting of alkyl of about 4 to about 12 carbon atoms and aralkyl of about 7 to about 12 carbon atoms, and $R^3$ is selected from the group consisting of hydrogen, halogen and alkyl of about 1 to about 12 carbon atoms and aralkyl of about 7 to about 12 carbon atoms.

13. A composition of matter comprising (1) a substantially stable halogenated diene rubber which deteriorates when exposed to an oxygen-containing gas in the presence of a metal contaminant compound selected from the group consisting of cobalt, lead, barium, cadmium, copper, iron and manganese, and non-primary phosphite salts thereof, (2) a contaminating amount of said metal contaminant, and (3) a minor proportion of a primary phosphite having the formula

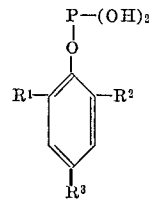

wherein $R^1$ and $R^2$ are selected from the group consisting of alkyl of about 4 to about 12 carbon atoms and aralkyl of about 7 to about 12 carbon atoms, and $R^3$ is selected from the group consisting of hydrogen, halogen and alkyl of about 1 to about 12 carbon atoms and aralkyl of about 7 to about 12 carbon atoms.

14. A composition of matter comprising an organic substance selected from the group consisting of a hydrocarbon polyolefin, polyvinyl chloride, an alkylaryl hydrocarbon, a diene rubber, a vegetable fat, a vegetable oil, an animal fat, an animal oil, gasoline, motor oil, sebacates and polyglycols, said organic substance being reasonably stable under normal conditions and being unstable when exposed to an oxygen-containing gas in the presence of a metal or metal compound, a minor proportion of a contaminant selected from the group consisting of a metal contaminant and a derivative compound thereof, said metal contaminant being selected from the group consisting of cobalt, lead, barium, cadmium, copper, iron and manganese, and non-primary phosphite salts thereof, and a minor proportion of a primary phosphite salt having the formula

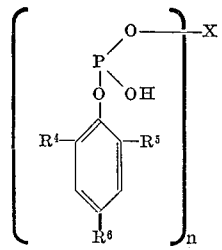

wherein $R^4$ and $R^5$ are selected from the group consisting of alkyl of about 4 to about 12 carbon atoms and aralkyl of about 7 to about 12 carbon atoms, $R^6$ is selected from the ground consisting of hydrogen, halogen and alkyl of about 1 to about 12 carbon atoms and aralkyl of about 7 to about 12 carbon atoms, X is selected from the group consisting of ammonium, substituted ammonium radical and metal radical, and $n$ is an integer from 1 to 4, representing the valence of X.

15. The composition of matter in accordance with claim 14 wherein the primary phosphite salt is present in an amount in the range of 0.01 to 2.0 percent based on the weight of the composition, and wherein $R^6$ is selected from the group consisting of alkyl of 1 to about 12 carbon atoms and aralkyl of about 7 to about 12 carbon atoms.

16. The composition of matter in accordance with claim 15 wherein the organic substance is selected from the group consisting of diene rubbers, polyolefins and polyvinyl chloride.

17. The composition of matter in accordance with claim 14 wherein $R^6$ is selected from the group consisting of said alkyl and said aralkyl.

18. The composition of matter in accordance with claim 14 wherein $R^6$ is of from 4 to 12 carbon atoms, and wherein $R^4$ and $R^5$ are alkyl.

19. A composition of matter in accordance with claim 14, wherein the organic substance is selected from the group consisting of polypropylene and 1,3,5-triisopropylbenzene.

20. A composition of matter in accordance with claim 14, wherein $R^4$ and $R^5$ are alkyl.

21. A composition according to claim 20, wherein $R^4$ and $R^5$ are tertiary butyl groups, X is selected from the group consisting of sodium, potassium, copper, cobalt, lead, calcium, zinc, iron, nickel, tin and chromium and the metal or metal compound contaminant is a metal or compound of a metal selected from the group consisting of cobalt, lead, barium, cadmium, copper, iron and manganese.

22. A composition according to claim 21, wherein $R^6$ is a tertiary butyl group.

23. A composition according to claim 18, wherein $R^4$, $R^5$, and $R^6$ are tertiary butyl groups.

24. A composition according to claim 18, wherein $R^4$ and $R^5$ are tertiary butyl groups, and $R^6$ is hydrogen.

25. A composition of matter comprising (1) a substantially stable hydrocarbon polyolefin which deteriorates when exposed to an oxygen-containing gas in the presence of a metal contaminant compound selected from the group consisting of cobalt, lead, barium, cadmium, copper, iron and manganese, and non-primary phosphite salts thereof, (2) a contaminating amount of said metal contaminant, and (3) a minor proportion of a primary phosphite salt having the formula

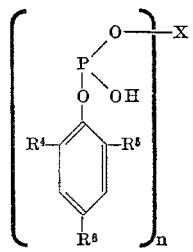

wherein $R^4$ and $R^5$ are selected from the group consisting of alkyl of 4 to 12 carbon atoms and aralkyl of 7 to 12 carbon atoms, $R^6$ is selected from the group consisting of hydrogen, halogen, alkyl of 1 to 12 carbon atoms and aralkyl of 7 to 12 carbon atoms, X is selected from the group consisting of ammonium, substituted ammonium radical and metal radical, and $n$ is an integer from 1 to 4, representing the valence of X.

26. A composition of matter comprising (1) a substantially stable polyvinyl chloride which deteriorates when exposed to an oxygen-containing gas in the presence of a metal contaminant compound selected from the group consisting of cobalt, lead, barium, cadmium, copper, iron and manganese, and non-primary phosphite salts thereof, (2) a contaminating amount of said metal contaminant, and (3) a minor proportion of a primary phosphite salt having the formula

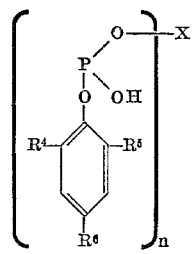

wherein $R^4$ and $R^5$ are selected from the group consisting of alkyl of 4 to 12 carbon atoms and aralkyl of 7 to 12 carbon atoms, $R^6$ is selected from the group consisting of hydrogen, halogen, alkyl of 1 to 12 carbon atoms and aralkyl of 7 to 12 carbon atoms, X is selected from the group consisting of ammonium, substituted ammonium radical and metal radical, and $n$ is an integer from 1 to 4, representing the valence of X.

27. A composition of matter comprising (1) a substantially stable alkyl aromatic hydrocarbon which deteriorates when exposed to an oxygen-containing gas in the presence of a metal contaminant compound selected from the group consisting of cobalt, lead, barium, cadmium, copper, iron and manganese, and non-primary phosphite salts thereof, (2) a contaminating amount of said metal contaminant, and (3) a minor proportion of a primary phosphite salt having the formula

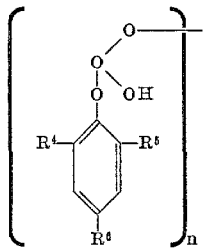

wherein $R^4$ and $R^5$ are selected from the group consisting of alkyl of 4 to 12 carbon atoms and aralkyl of 7 to 12 carbon atoms, $R^6$ is selected from the group consisting of hydrogen, halogen, alkyl of 1 to 12 carbon atoms and aralkyl of 7 to 12 carbon atoms, X is selected from the group consisting of ammonium, substituted ammonium radical and metal radical, and $n$ is an integer from 1 to 4, representing the valence of X.

28. A composition of matter comprising (1) a substantially stable halogenated diene rubber which deteriorates when exposed to an oxygen-containing gas in the presence of a metal contaminant compound selected from the group consisting of cobalt, lead, barium, cadmium, copper, iron and manganese, and non-primary phosphite salts thereof, (2) a contaminating amount of said metal contaminant compound, and (3) a minor proportion of a primary phosphite salt having the formula

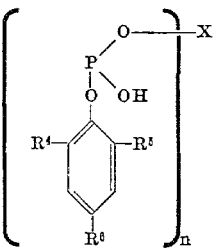

wherein $R^4$ and $R^5$ are selected from the group consisting of alkyl of 4 to 12 carbon atoms and aralkyl of 7 to 12 carbon atoms, $R^6$ is selected from the group consisting of hydrogen, halogen, alkyl of 1 to 12 carbon atoms and aralkyl of 7 to 12 carbon atoms, X is selected from the group consisting of ammonium, substituted ammonium radical and metal radical, and $n$ is an integer from 1 to 4, representing the valence of X.

References Cited

UNITED STATES PATENTS

| | | | |
|---|---|---|---|
| 2,732,365 | 1/1956 | Bill et al. | 260—45.7 |
| 2,770,546 | 11/1956 | Thompson | 99—163 |
| 3,270,072 | 8/1966 | Pesacreta | 260—666.5 |
| 3,271,481 | 9/1966 | Kujawa et al. | 260—960 |
| 3,274,014 | 9/1966 | Harrington et al. | 106—177 |
| 3,126,343 | 3/1964 | Wilson | 252—49.8 |
| 3,412,118 | 11/1968 | Kujawa et al. | 260—429 |

DONALD E. CZAJA, Primary Examiner

R. A. WHITE, Assistant Examiner

U.S. Cl. X.R.

44—68, 76; 99—163; 252—49.7, 49.8; 260—45.7, 45.9, 398.5, 611.5, 666.5

PO-1050
(5/69)

UNITED STATES PATENT OFFICE
CERTIFICATE OF CORRECTION

Patent No. 3,523,099          Dated August 4, 1970

Inventor(s) Alvin F. Shepard et al.

It is certified that error appears in the above-identified patent and that said Letters Patent are hereby corrected as shown below:

Column 1, under Abstract of the Disclosure, second formula, delete formula, and insert

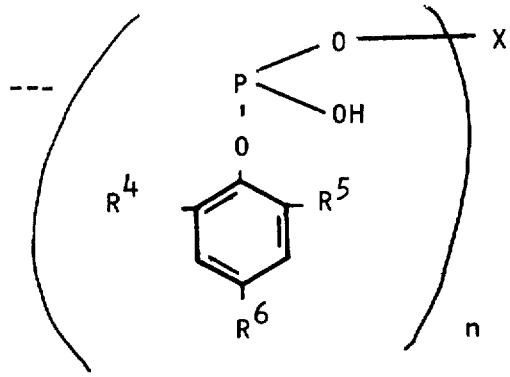

Column 5, line 71, delete "$PO_3)_3$" and insert --- $PO_3)_2$ ---.
Column 6, line 21, delete "phosphate" and insert --- phosphite ---.
Column 8, Claim 4, line 46, delete "$R^3$ of 4" and insert --- $R^3$ is of 4 ---.
Column 12, Claim 27, line 15, delete formula and insert

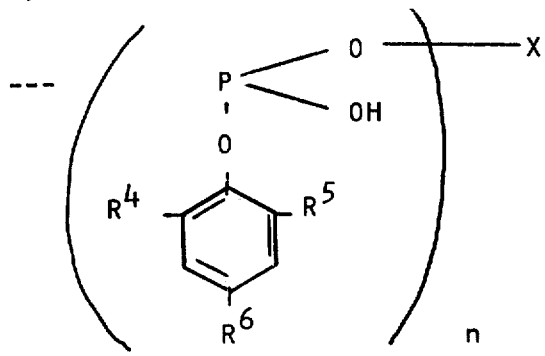

Signed and sealed this 3rd day of November 1970.

(SEAL)
Attest:

Edward M. Fletcher, Jr.
Attesting Officer

WILLIAM E. SCHUYLER, JR.
Commissioner of Patents